(No Model.)
H. W. ADAMS, Jr.
VALVE DEVICE FOR PNEUMATIC TIRES.
No. 560,183. Patented May 19, 1896.
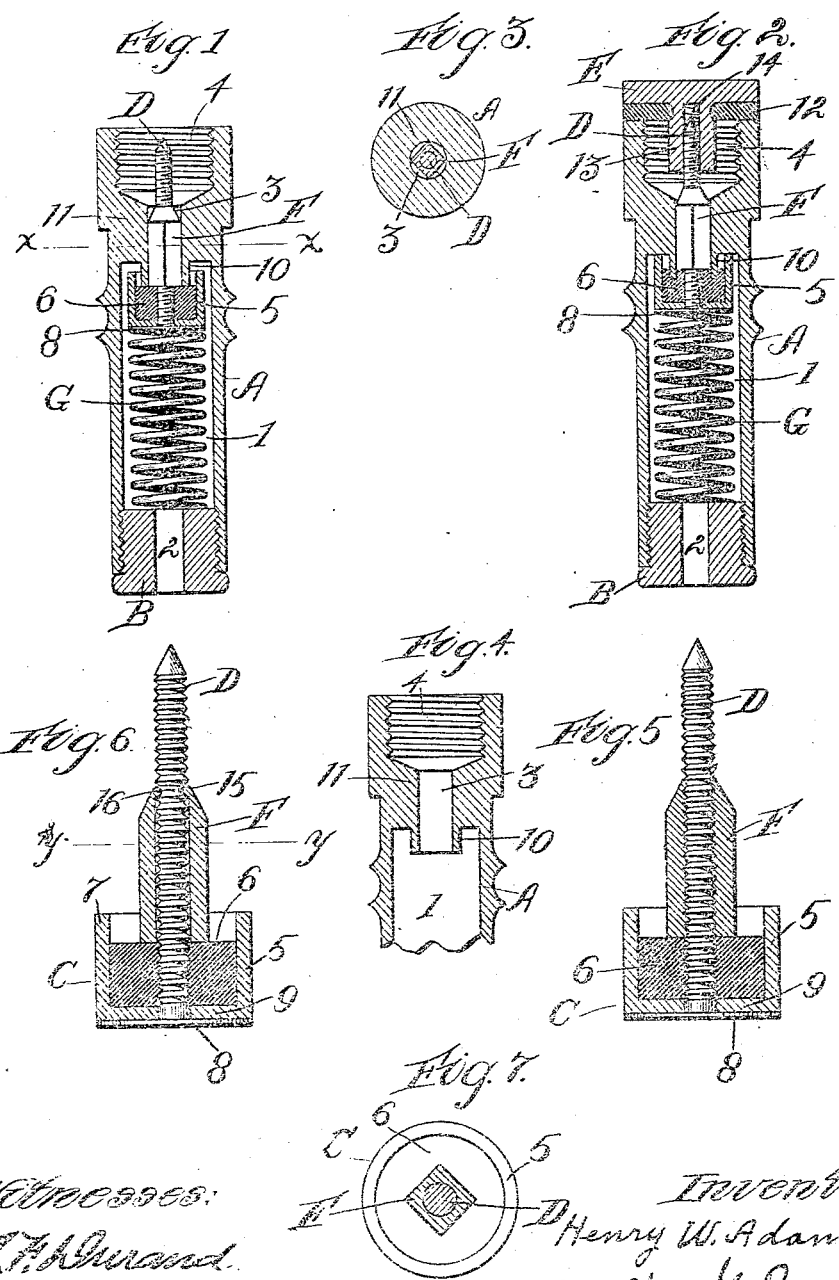
Witnesses:
Inventor:
Henry W. Adams, Jr.
By Chas. G. Page, Atty.

United States Patent Office.

HENRY W. ADAMS, JR., OF ELGIN, ILLINOIS, ASSIGNOR TO FRED W. MORGAN AND RUFUS WRIGHT, OF CHICAGO, ILLINOIS.

VALVE DEVICE FOR PNEUMATIC TIRES.

SPECIFICATION forming part of Letters Patent No. 560,183, dated May 19, 1896.

Application filed April 30, 1895. Serial No. 547,608. (No model.)

*To all whom it may concern:*

Be it known that I, HENRY W. ADAMS, Jr., a citizen of the United States, residing at Elgin, in the county of Kane and State of Illinois, have invented a certain new and useful Improvement in Valve Devices for Pneumatic Tires, of which the following is a specification.

Prominent objects of my invention are to prevent injury to an elastic packing which forms the seating portion of the valve, to insure a tight joint between the valve and valve-seat when the valve is closed, to prevent the packing from sticking to the valve-seat and becoming disarranged when the valve is opened, to steady the valve and cause it to work and close perfectly true, and to provide certain improved details serving to increase the general efficiency of valve devices for pneumatic tires and afford a simple and practical construction.

To the attainment of the foregoing and other useful ends my invention consists in matters hereinafter set forth.

In the accompanying drawings, Figure 1 represents a section taken centrally and longitudinally through a valve device embodying my invention, the cap or nut for tightening up and locking the valve being omitted. Fig. 2 is a similar view including the cap or nut and showing the valve tightened against its seat and locked. Fig. 3 is a section on line *x x* in Fig. 1. Fig. 4 shows the upper end portion of the casing represented in Fig. 1. Fig. 5 shows the valve and certain adjuncts, partly in central longitudinal section and partly in elevation. Fig. 6 is a like view showing the sleeve F having an unthreaded bore. Fig. 7 is a sectional plan on line *y y* in Fig. 6.

The cylindric shell or casing A is understood to be adapted for insertion within the tubular flexible nipple of a pneumatic tire, as usual. The valve-chamber 1 within this casing is suitably closed at one end—for example, by a screw-plug B, having a bore 2, which provides a passage between the valve-chamber and the interior of the pneumatic tire. The casing is also adapted to provide a passage or throat 3, leading from the valve-chamber to a threaded socket 4, which is provided at said end of the casing. The threaded socket 4 is adapted to couple with the threaded nozzle of an air-pump, and the throat 3 provides an air-passage between the valve-chamber and said socket. The valve C comprises a cylindric cup-shaped head 5, having a flat bottom, and an elastic packing 6, which is fitted within the cup and arranged below the open end 7 of the same. The stem D of the valve is threaded and arranged to extend centrally through the flat bottom of the cup and the elastic washer or packing. Said valve-stem is also provided at one end with a thin flat disk 8, which fits against the under side of the said flat bottom 9 of the cup or cup-shaped head 5. The inner end portion of the throat 3 is formed by a neck 10, which extends back from the internally-thickened portion 11 of the casing and projects within the valve-chamber. When the valve is in position to close the throat, the said neck is received within the open end of the cup, so as to engage the packing, as in Fig. 1, and when the valve is tightened up against the seat formed by the annular end of the neck said seat or end of the neck will press into the elastic packing, as in Fig. 2. By thus employing one end of the neck as a seat for the valve a tight joint can be provided when the valve is closed, and at the same time the packing will not stick to the seat during the act of opening the valve. It will also be noted that by arranging the face of the elastic packing below the end 7 of the cup so as to leave an annular space within the latter the packing cannot be forced or crowded over the edge of the end 7 of the cup when the valve is tightened up, it being understood that in valves where the packing is allowed to thus spread over such edge it becomes cut or ruptured. By my arrangement, however, any portion of the packing which may bulge up when the valve is closed will simply fill a portion of the space around the neck, as in Fig. 2.

The nut or cap E is provided with a washer 12 and is constructed with a stem 13, having a threaded socket 14 for engaging the threaded end of the valve-stem, by which arrangement the valve can be tightened against the seat by properly turning the nut or cap. The nut or cap is used alternately with the air-pump—that is to say, after the tire has been inflated the air-pump is disconnected from the threaded socket 4, and the cap is then applied, as in Fig. 2, so that by turning the cap the valve can be tightened upon the seat and be locked in such condition by the cap, which also closes the outer end of the casing and excludes dust and moisture from the interior of the casing. The threaded valve-stem is also provided with a portion which is externally polygonal in cross-section, and while a polygonal portion could for the broader purposes of my invention be formed by properly shaping a portion of the stem I prefer as a matter of further improvement to form the same by a sleeve F, which is arranged upon the stem. The throat 3 provides a guideway for this polygonal portion or sleeve F and thereby steadies the valve, and by reason of the conformation of said sleeve suitable air-passages are left between the same and the cylindric wall of the throat. The sleeve is preferably formed with a threaded bore, and in such case it is screwed down upon the threaded stem, as in Fig. 5. By such arrangement the sleeve provides a nut which can be tightened down upon the elastic packing, so as to maintain the latter in place during use, and at the same time the said sleeve maintains the longitudinal axis of the valve in exact coincidence with a line passing centrally and longitudinally through the throat. The valve will therefore be held against tilt or wabble and will always work true, thereby avoiding a difficulty common to valves for pneumatic tires. As another arrangement, the bore of the sleeve can be unthreaded, as in Fig. 6, and in such case one end of the sleeve can be turned in, as at 15, so as to engage in a groove 16 in the valve-stem.

The spring G is arranged between the valve and the end plug B, and said spring can be simply interposed between such two members without need of a centering projection on the valve extending within the coiled spring, since the sleeve F will at all times keep the valve true. In this way full advantage can be taken of the resilient action of the spring, since it will not inclose and be in frictional contact with any projection from the valve.

The stem D is shown threaded along its entire length, but if preferred it can be threaded along its upper portion when the construction shown in Fig. 6 is adopted.

What I claim as my invention is—

1. A valve device for pneumatic tires, comprising a casing containing a valve-chamber and a throat leading from the same, a valve arranged within the valve-chamber and constructed with a cup, an elastic packing fitted within the cup, and a stem extending through the elastic packing and provided with a polygonal portion formed by a sleeve which is held upon the stem and arranged to fit within and work through the throat, and a spring acting to normally close the valve, substantially as described.

2. A valve device for pneumatic tires, comprising a casing containing a valve-chamber and a throat leading from one end of the same, a valve arranged within the valve-chamber and provided with a threaded stem and an elastic packing, and an externally-polygonal sleeve which is internally threaded and screwed upon the valve-stem, substantially as and for the purpose set forth.

3. A valve device for pneumatic tires, comprising the shell A containing a valve-chamber 1 and a throat 3 leading therefrom, a valve arranged within the valve-chamber and constructed with a cup 5 containing an elastic packing, a screw-threaded stem having a disk 8 fitted against the cup, and a sleeve F secured upon the stem and arranged to work within the throat, and a spring arranged to normally close the valve, substantially as described.

4. A valve device for pneumatic tires, comprising a shell containing a valve-chamber and a throat leading therefrom and having one of its end portions formed by a neck 10, a valve C arranged within the valve-chamber and constructed with a cup, an elastic packing fitted within the cup, and a stem, and a sleeve F secured upon the valve-stem and arranged to work through the throat, substantially as described.

5. A valve device for pneumatic tires, comprising the shell or casing constructed with an internally-arranged valve-chamber; a neck forming a valve-seat at one end of such chamber, and a throat leading from the valve-chamber and extending centrally through the neck which forms the valve-seat; a valve arranged within the valve-chamber and comprising a cup containing an elastic packing arranged with its face below the rim of the cup so as to provide space wherein the neck which forms the seat is received when the valve is closed; a spring arranged within the valve-chamber and tending to seat the valve; and a valve-stem extending from the bottom of the cup centrally through the elastic packing and having a polygonal portion which works within the throat and engages the wall of the same, substantially as described.

HENRY W. ADAMS, JR.

Witnesses:
RETA M. WAGNER,
CHAS. G. PAGE.